United States Patent
Fujishiro (10) Patent No.: US 12,464,406 B2
(45) Date of Patent: Nov. 4, 2025

(54) COMMUNICATION CONTROL METHOD AND COMMUNICATION APPARATUS

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 433 days.

(21) Appl. No.: 18/054,465

(22) Filed: Nov. 10, 2022

(65) Prior Publication Data

US 2023/0076524 A1 Mar. 9, 2023

Related U.S. Application Data

(63) Continuation of application No. PCT/JP2021/015614, filed on Apr. 15, 2021.

(30) Foreign Application Priority Data

May 13, 2020 (JP) .................................. 2020-084807

(51) Int. Cl.
*H04L 47/32* (2022.01)
*H04W 24/08* (2009.01)
*H04W 28/06* (2009.01)

(52) U.S. Cl.
CPC ............. *H04W 28/06* (2013.01); *H04L 47/32* (2013.01); *H04W 24/08* (2013.01)

(58) Field of Classification Search
CPC ...... H04L 47/32; H04W 24/08; H04W 28/06; H04W 28/10
See application file for complete search history.

(56) References Cited

U.S. PATENT DOCUMENTS

| | | | |
|---|---|---|---|
| 2016/0164793 A1 | 6/2016 | Basu Mallick et al. | |
| 2016/0338132 A1 | 11/2016 | Uchino et al. | |
| 2016/0373346 A1* | 12/2016 | Hirota | H04L 45/38 |

FOREIGN PATENT DOCUMENTS

| | | | |
|---|---|---|---|
| JP | 2016-046599 A | 4/2016 | |
| JP | 2019-036998 A | 3/2019 | |
| WO | WO-2005088917 A1 * | 9/2005 | H04L 47/10 |
| WO | WO-2015141478 A1 * | 9/2015 | H04L 1/00 |

OTHER PUBLICATIONS

3rd Generation Partnership Project; Technical Specification Group Radio Access Network; NR; NR and NG-RAN Overall Description; Stage 2; 3GPP TS 38.300 V16.1.0; Mar. 2020; pp. 1-133; Release 16; 3GPP Organizational Partners, Valbonne, France.

* cited by examiner

*Primary Examiner* — Melvin C Marcelo
*Assistant Examiner* — Natali Pascual Peguero
(74) *Attorney, Agent, or Firm* — Studebaker Brackett PLLC (57) ABSTRACT

The communication control method controls wireless communication of a packet from a first communication apparatus to a second communication apparatus in a mobile communication system. The communication control method includes, in the first communication apparatus, measuring, on a per packet basis, a residence time of a packet which has not been transmitted and has resided in the first communication apparatus, comparing the residence time of the packet with a time threshold, and discarding the packet of which the residence time exceeds the time threshold without transmitting the packet.

10 Claims, 11 Drawing Sheets

COMMUNICATION CONTROL METHOD AND COMMUNICATION APPARATUS

RELATED APPLICATIONS

The present application is a continuation based on PCT Application No. PCT/JP2021/015614, filed on Apr. 15, 2021, which claims the benefit of Japanese Patent Application No. 2020-084807 filed on May 13, 2020. The content of which is incorporated by reference herein in their entirety.

TECHNICAL FIELD

The present disclosure relates to a communication control method and a communication apparatus that are used in a mobile communication system.

BACKGROUND OF INVENTION

In recent years, a mobile communication system of the fifth generation (5G) has attracted attention. Such 5G systems are expected to allow eXtended Reality (XR) services such as augmented reality (AR), mixed reality (MR), and virtual reality (VR) to be provided, by utilizing the features of high speed communication and low latency.

CITATION LIST

Non-Patent Literature

NPL 1: 3GPP Technical Specification "3GPP TS 38.300 V16.1.0 (2020-03)"

SUMMARY

In a first aspect, a communication control method controls wireless communication of a packet from a first communication apparatus to a second communication apparatus in a mobile communication system. The communication control method includes, by the first communication apparatus, measuring, on a per packet basis, a residence time of a packet which has not been transmitted and has resided in the first communication apparatus, comparing the residence time of the packet with a time threshold, and discarding the packet of which the residence time exceeds the time threshold without transmitting the packet.

In a second aspect, a communication apparatus transmits a packet to another communication apparatus in a mobile communication system. The communication apparatus includes at least one processor configured to execute processing of measuring, on a per packet basis, a residence time of a packet which has not been transmitted and has resided in the communication apparatus, processing of comparing the residence time of the packet with a time threshold, and processing of discarding the packet of which the residence time exceeds the time threshold without transmitting the packet.

DESCRIPTION OF EMBODIMENTS

XR services focus on streaming, and thus often use a User Datagram Protocol (UDP) as an upper layer protocol. In wireless communication using such a service, delay in transmission of one packet may cause delay in transmission of the subsequent packet. As a result, the real-time performance may be impaired, degrading the service quality.

The object of the present disclosure is to provide improvement for the service quality of a service required to have a high real-time performance.

A mobile communication system according to an embodiment will be described with reference to the drawings. In the description of the drawings, the same or similar parts are denoted by the same or similar reference signs.

Configuration of Mobile Communication System

Figure 1:
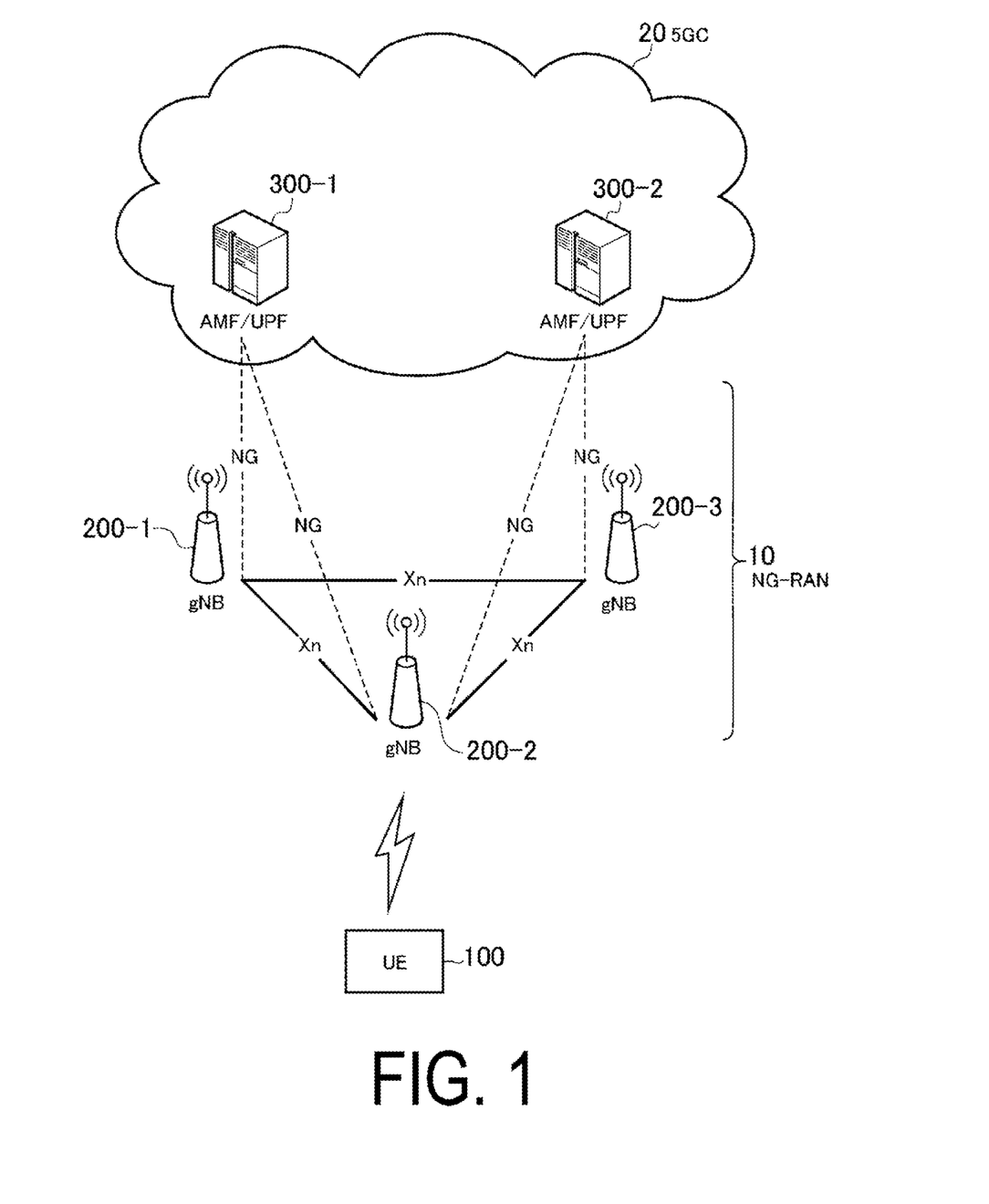
FIG. 1 is a diagram illustrating a configuration of a mobile communication system according to an embodiment.

First, a configuration of a mobile communication system according to an embodiment will be described. FIG. 1 is a diagram illustrating a configuration of the mobile communication system according to an embodiment. This mobile communication system complies with the 5th Generation System (5GS) of the 3GPP standard. The description below takes the 5GS as an example, but Long Term Evolution (LTE) system may be at least partially applied to the mobile communication system.

As illustrated in FIG. 1, the mobile communication system includes a user equipment (UE) 100, a 5G radio access network (next generation radio access network (NG-RAN)) 10, and a 5G core network (5GC) 20.

The UE 100 is a mobile wireless communication apparatus. The UE 100 may be any apparatus as long as the UE 100 is used by a user. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), and/or a flying object or an apparatus provided on a flying object (Aerial UE).

The NG-RAN 10 includes base stations (referred to as "gNBs" in the 5G system) 200. The gNBs 200 are interconnected via an Xn interface which is an inter-base station interface. Each gNB 200 manages one or a plurality of cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. A "cell" is used as a term to indicate a minimum unit of a wireless communication area. A "cell" is also used as a term to indicate a function or a resource for performing wireless communication with the UE 100. One cell belongs to one carrier frequency.

Note that the gNB can be connected to an Evolved Packet Core (EPC) corresponding to a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various types of mobility controls and the like for the UE 100. The AMF manages mobility of the UE 100 by communicating with the UE 100 by using Non-Access Stratum (NAS) signaling. The UPF controls data transfer. The AMF and UPF are connected to the gNB 200 via an NG interface which is an interface between a base station and the core network.

Figure 2:
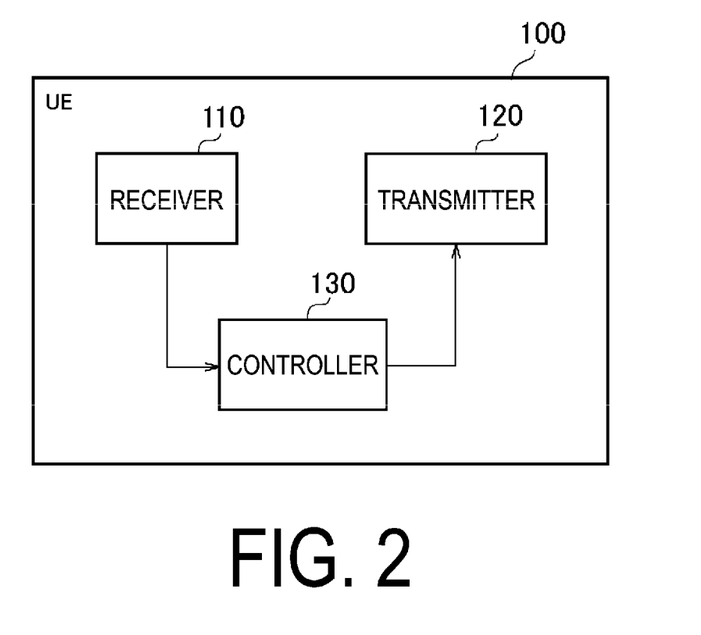
FIG. 2 is a diagram illustrating a configuration of a user equipment (UE) according to an embodiment.

FIG. 2 is a diagram illustrating a configuration of the UE 100 (user equipment) according to an embodiment.

As illustrated in FIG. 2, the UE 100 includes a receiver 110, a transmitter 120, and a controller 130.

The receiver 110 performs various types of receptions under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmissions under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various types of controls for the UE 100. The controller 130 includes at least one processor and at least one memory. The memory stores programs to be executed by the processor and information to be used for processes by the processor. The processor may include a baseband processor and a Central Processing Unit (CPU). The baseband processor performs modulation and demodulation, and coding and decoding of a baseband signal, and the like. The CPU executes the programs stored in the memory to perform various types of processes.

Figure 3:
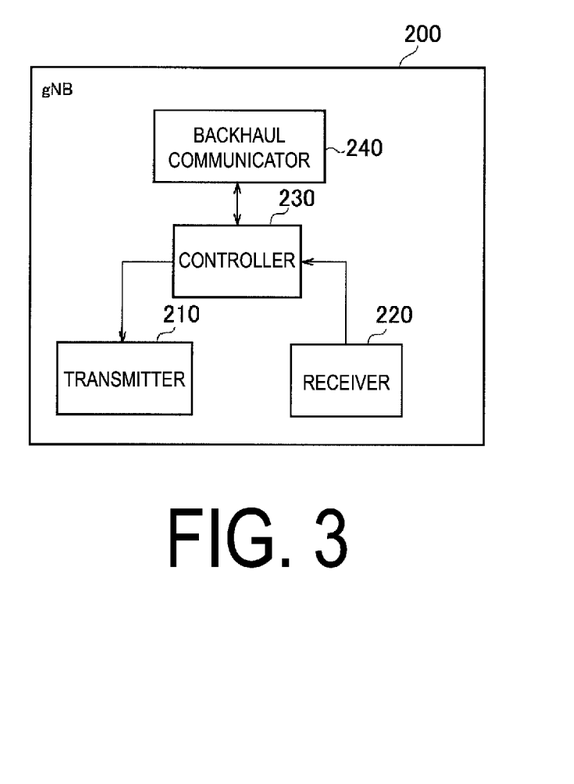
FIG. 3 is a diagram illustrating a configuration of a base station (gNB) according to an embodiment.

FIG. 3 is a diagram illustrating a configuration of the gNB 200 (base station) according to an embodiment.

As illustrated in FIG. 3, the gNB 200 includes a transmitter 210, a receiver 220, a controller 230, and a backhaul communicator 240.

The transmitter 210 performs various types of transmissions under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various types of receptions under control of the controller 230. The receiver 220 includes an antenna and a reception device. The reception device converts a radio signal received through the antenna into a baseband signal (a reception signal) and outputs the resulting signal to the controller 230.

The controller 230 performs various types of controls for the gNB 200. The controller 230 includes at least one processor and at least one memory. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes.

The backhaul communicator 240 is connected to a neighboring base station via the inter-base station interface. The backhaul communicator 240 is connected to the AMF/UPF 300 via the interface between a base station and the core network. Note that the gNB may include a Central Unit (CU) and a Distributed Unit (DU) (i.e., functions are divided), and both units may be connected via an F1 interface.

Figure 4:
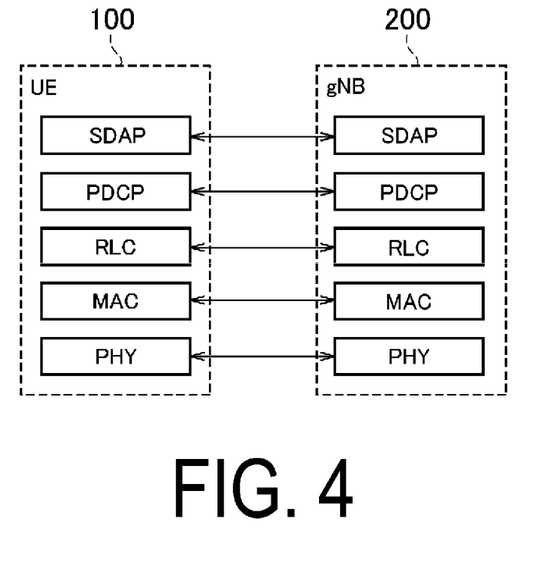
FIG. 4 is a diagram illustrating a configuration of a protocol stack of a radio interface in a user plane handling data.

FIG. 4 is a diagram illustrating a configuration of a protocol stack of a radio interface of a user plane handling data.

As illustrated in FIG. 4, the radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

The MAC layer performs priority control of data, a retransmission process through a hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, modulation and coding schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an IP flow which is a unit of QoS control by the core network and a radio bearer which is a unit of QoS control by an Access Stratum (AS). Note that, when the RAN is connected to the EPC, the SDAP may not be provided.

Figure 5:
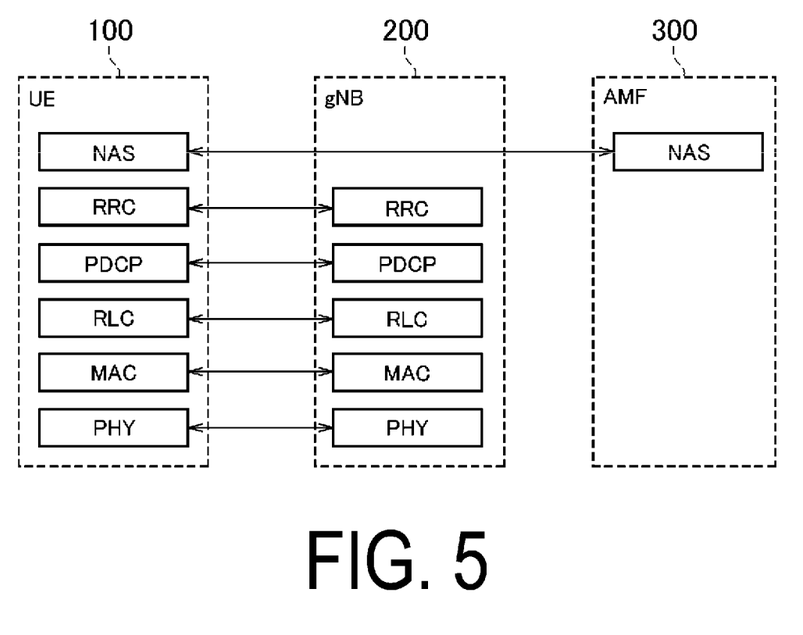
FIG. 5 is a diagram illustrating a configuration of a protocol stack of a radio interface in a control plane handling signaling (control signals).

FIG. 5 is a diagram illustrating a configuration of a protocol stack of a radio interface in a control plane handling signaling (control signals).

As illustrated in FIG. 5, the protocol stack of the radio interface in the control plane includes a Radio Resource Control (RRC) layer and a Non-Access Stratum (NAS) layer instead of the SDAP layer illustrated in FIG. 4.

RRC signaling for various configurations is transmitted between the RRC layer of the UE 100 and the RRC layer of the gNB 200. The RRC layer controls a logical channel, a transport channel, and a physical channel according to establishment, reestablishment, and release of a radio bearer. When a connection (RRC connection) exists between the RRC of the UE 100 and the RRC of the gNB 200, the UE 100 is in an RRC connected mode. When no connection (RRC connection) exists between the RRC of the UE 100 and the RRC of the gNB 200, the UE 100 is in an RRC idle mode.

The NAS layer higher than the RRC layer performs session management, mobility management, and the like. NAS signaling is transmitted between the NAS layer of the UE 100 and the NAS layer of the AMF 300.

Note that the UE 100 has an application layer and the like other than the protocol of the radio interface.

Communication Control Method

A communication control method according to an embodiment will be described.

(1) Overview of Communication Control Method

Figure 6:
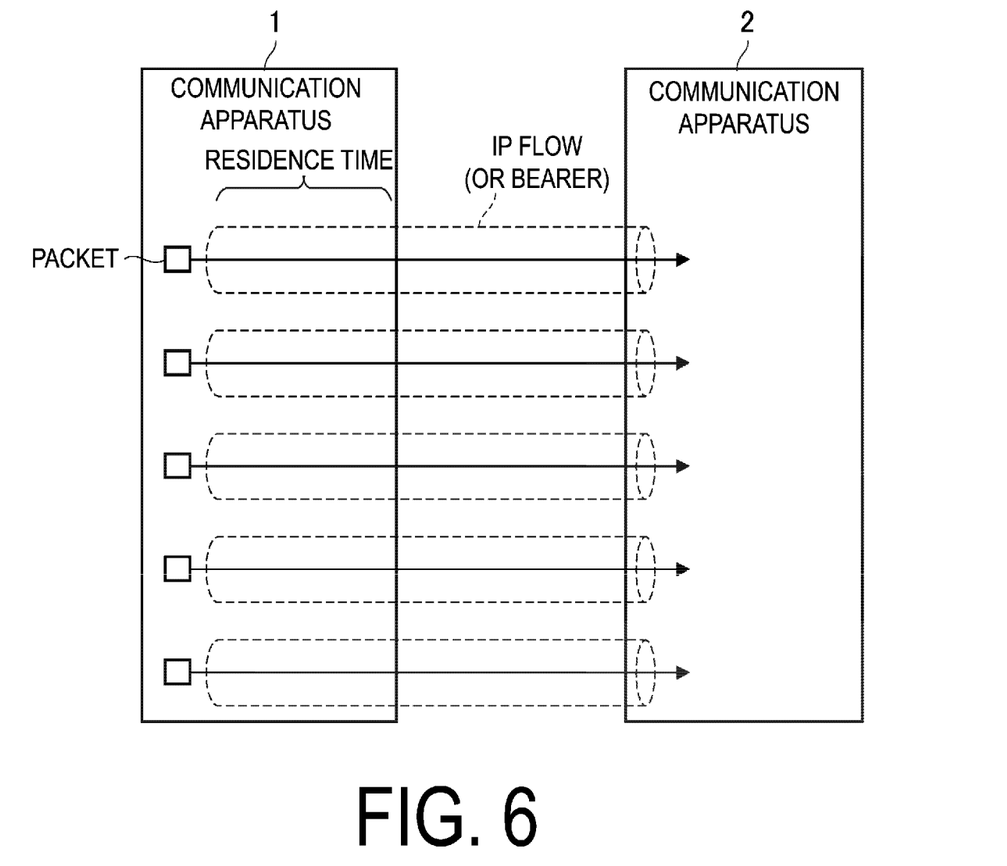
FIG. 6 is a diagram illustrating an overview of a communication control method according to an embodiment.

FIG. 6 is a diagram illustrating an overview of a communication control method according to an embodiment.

As illustrated in FIG. 6, in an embodiment, the communication control method is a method for controlling wireless communication of a packet from a communication apparatus 1 (first communication apparatus) to a communication apparatus 2 (second communication apparatus) in a mobile communication system. In other words, the communication apparatus 1 is a communication apparatus on a packet transmission side, and the communication apparatus 2 is a communication apparatus on a packet reception side.

In an embodiment, the communication control method applies to an uplink, a downlink, or a sidelink. For the uplink, the communication apparatus 1 is the UE 100 and the communication apparatus 2 is the gNB 200. For the downlink, the communication apparatus 1 is the gNB 200 and the communication apparatus 2 is the UE 100. For the sidelink, the communication apparatus 1 is the UE 100 and the communication apparatus 2 is another UE 100. Note that the sidelink is a link used for direct communication between UEs 100.

In the example illustrated in FIG. 6, the communication apparatus 1 has established a plurality of IP flows or a plurality of bearers with the communication apparatus 2. Note that, the communication apparatus 1 may establish only one IP flow or only one bearer with the communication apparatus 2. The bearers may be interpreted as logical channels.

The communication apparatus 1 wirelessly transmits a packet to the communication apparatus 2 via each IP flow or each bearer. For example, the packet transmitted via the IP flow is an IP packet. The packet transmitted via the bearer may be a PDCP packet.

The packet to be transmitted to the communication apparatus 2 has a transmission delay due to processing in each layer of the communication apparatus 1. In other words, a packet which has not been transmitted and has resided exists in the communication apparatus 1. Hereinafter, a delay time caused by processing in the communication apparatus 1 is referred to as a residence time. For example, the communication apparatus 1 measures the residence time for each IP packet.

The communication apparatus 1 may measure the residence time in one layer, or may measure the residence time across a plurality of layers. An example in which the communication apparatus 1 measures the residence time in one layer will be mainly described below. The one layer is a MAC layer, an RLC layer, or a PDCP layer.

For example, XR services focus on streaming, and use the UDP as an upper layer protocol. In such a case, in the communication apparatus 1, delay in transmission of one packet may cause delay in transmission of the subsequent packet. As a result, the real-time performance may be impaired, degrading the service quality.

In a communication control method according to an embodiment, the communication apparatus 1 measures the residence time for each packet which has not been transmitted and has resided in the communication apparatus 1, and compares the residence time for each packet with a time threshold. The communication apparatus 1 discards a packet of which the residence time exceeds the time threshold, without transmitting the packet. Here, the discard of a packet may mean removing the packet from a buffer. The communication apparatus 1 further performs processing for transmitting, to the communication apparatus 2, a packet of which the residence time does not exceed the time threshold, even after discarding the packet of which the residence time exceeds the time threshold.

This allows the transmission of a packet with a long residence time to be suspended, and the influence of the delay on transmission of the subsequent packet can be reduced. This makes it easy to curb the degradation of the real-time performance, allowing the service quality to be improved. Note that such a mechanism of packet discard may be applied exclusively to a case in which the UDP is used as an upper layer protocol, for example, exclusively to the IP flow or bearer which uses the UDP or exclusively to the packet which uses the UDP. Such a mechanism of packet discard may be applied exclusively to the logical channel for which RLC is configured to be in an Unacknowledged Mode (UM) mode.

In one embodiment, the time threshold to be compared with the residence time may be individually configured per IP flow or per bearer. Note that the time threshold may be a period in which the transmission of the packet is valid (i.e., a valid period). For example, as a type of QoS information configured per IP flow or per bearer, the valid period (time threshold) for a packet is configured. Such a time threshold may be a survival time, or may be a packet delay budget.

Here, the survival time refers to the time during which the application can continue the communication service even when no communication is expected. That is, when no packet transmission occurs within the survival time, the application may determine that the communication service is blocked. The packet delay budget refers to the delay time (residence time) acceptable for the packet. The packet delay budget is a time shorter than the survival time.

The time threshold may be a parameter different from the survival time and the packet delay budget. For example, the time threshold may be equal to or greater than the packet delay budget, and may be equal to or less than the survival time. The time threshold may be equal to or greater than the survival time.

The communication apparatus 1 compares the residence time measured for the packet (target packet) with the time threshold corresponding to the IP flow or bearer to which the packet belongs. Thus, whether to discard the packet can be appropriately determined depending on the QoS characteristics of the IP flow or the bearer.

(2) Operations of Transmission-Side Communication Apparatus

Figure 7:
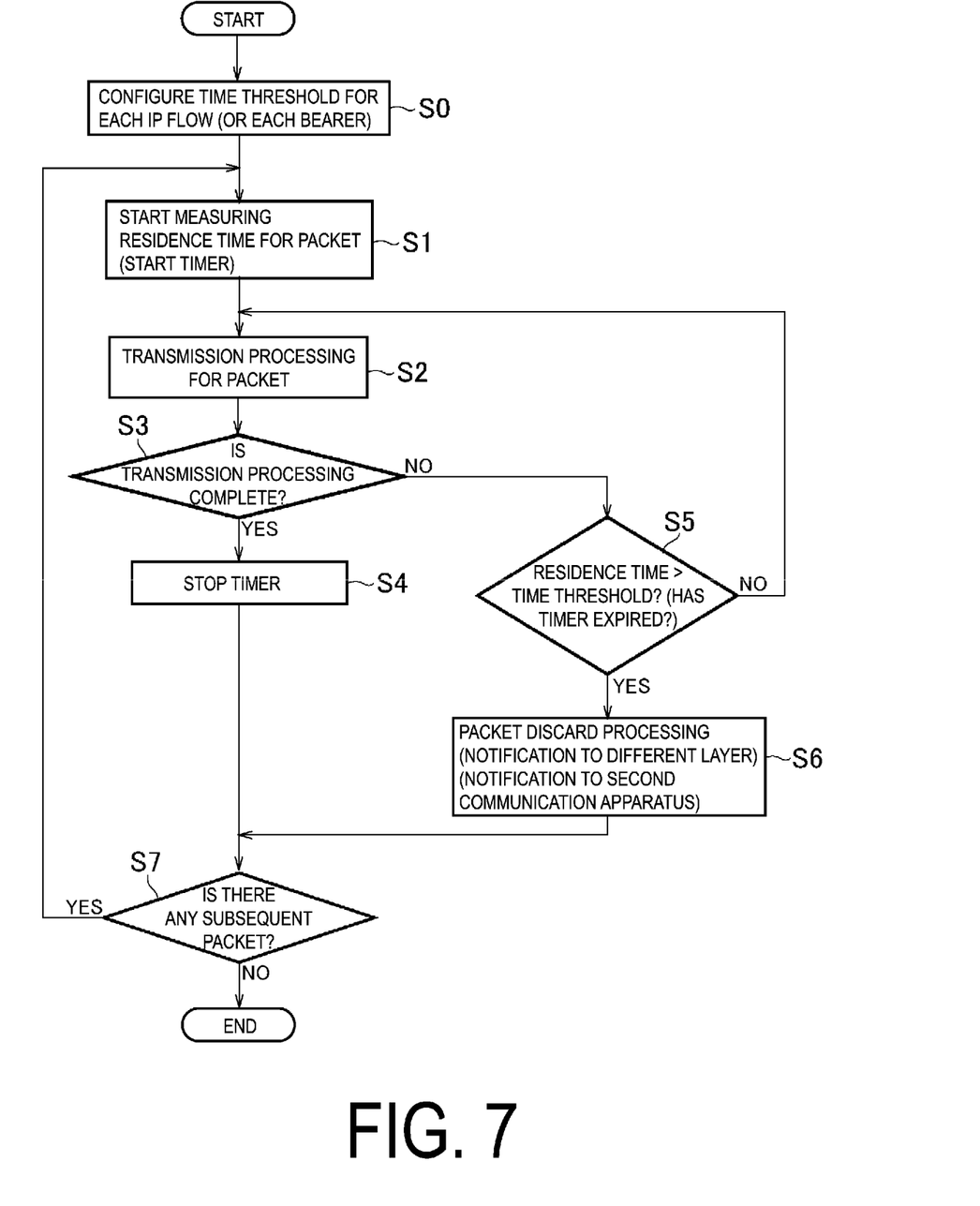
FIG. 7 is a diagram illustrating operations of a transmission-side communication apparatus according to an embodiment.

FIG. 7 is a diagram illustrating operations of the communication apparatus 1 (transmission-side communication apparatus) according to an embodiment.

As illustrated in FIG. 7, in step S0, the communication apparatus 1 configures a time threshold per IP flow or per bearer.

Each time threshold may be specified for the communication apparatus 1 by the communication apparatus 2. The communication apparatus 1 may determine each time threshold, and notify the communication apparatus 2 of the time threshold determined. The operations in one IP flow (or one bearer) for which the time threshold is configured will be described below.

In step S1, the communication apparatus 1 starts measuring the residence time of a packet (hereinafter referred to as a target packet). Here, when the first condition is satisfied for the target packet, the communication apparatus 1 starts the timer configured with the time threshold (valid period).

The first condition includes a condition that the target packet enters a predetermined layer of the communication apparatus 1. That is, the communication apparatus 1 starts the timer when the target packet enters the predetermined layer of the communication apparatus 1. For example, the predetermined layer is the MAC layer, the RLC layer, or the PDCP layer. The predetermined layer may be an SDAP layer. Note that a buffer in the predetermined layer stores the target packet. The buffer is of a FIFO (First In First Out) type.

In step S2, the communication apparatus 1 performs processing for transmitting the target packet. Specifically, the predetermined layer of the communication apparatus 1 performs processing on the target packet and then passes the target packet to the lower layer.

In step S3, the communication apparatus 1 determines whether the transmission processing for the target packet is complete. In other words, the communication apparatus 1 determines whether the second condition is satisfied for the target packet.

Here, the determination of whether the transmission processing for the target packet is complete may be determination of whether the target packet has been passed from a predetermined layer to a lower layer. Assuming that the predetermined layer is the PDCP layer, the PDCP layer determines whether the target packet (PDCP PDU) has been passed to the RLC layer.

The determination of whether the transmission processing for the target packet is complete may be determination of whether the target packet has arrived at the communication apparatus 2. For example, the predetermined layer of the communication apparatus 1 determines whether the target packet has arrived at the communication apparatus 2 based on whether a transmission acknowledgment (ACK) corresponding to the target packet in the predetermined layer has been received from the communication apparatus 2. Assuming that the predetermined layer is the MAC layer, the MAC layer determines, based on HARQ ACK, whether the target packet (MAC PDU) has arrived at the communication apparatus 2. Assuming that the predetermined layer is the RLC layer, the RLC layer determines, based on RLC ACK, whether the target packet (RLC PDU) has arrived at the communication apparatus 2. Assuming that the predetermined layer is the PDCP layer, the PDCP layer determines, based on a PDCP status report, whether the target packet (PDCP PDU) has arrived at the communication apparatus 2.

If the transmission processing for the target packet is determined to be complete (step S3: YES), then in step S4, the communication apparatus 1 stops the timer started in step S1. Subsequently, the processing proceeds to step S7.

On the other hand, if the transmission processing for the target packet is determined not to be complete (step S3: NO), then in step S5, the communication apparatus 1 determines whether the residence time of the target packet exceeds the time threshold. In other words, the communication apparatus 1 determines whether the timer started in step S1 has not been stopped and has expired.

If the residence time of the target packet does not exceed the time threshold (step S5: NO), the processing returns to step S2 (retransmission processing may be performed).

On the other hand, if the residence time of the target packet exceeds the time threshold (step S5: YES), then in step S6, the communication apparatus 1 performs processing for discarding the target packet without transmitting the target packet. For example, the predetermined layer of the communication apparatus 1 removes the target packet stored in the buffer of the predetermined layer. This causes the communication apparatus 1 to be in a state that allows processing for a packet subsequent to the target packet to be started.

When discarding the target packet, the predetermined layer of the communication apparatus 1 may notify a different layer from the predetermined layer that the target packet has been discarded. The different layer performs processing for transmitting the packet subsequent to the discarded target packet. The different layer is at least one selected from the group consisting of the MAC layer, the RLC layer, and the PDCP layer.

Figure 8:
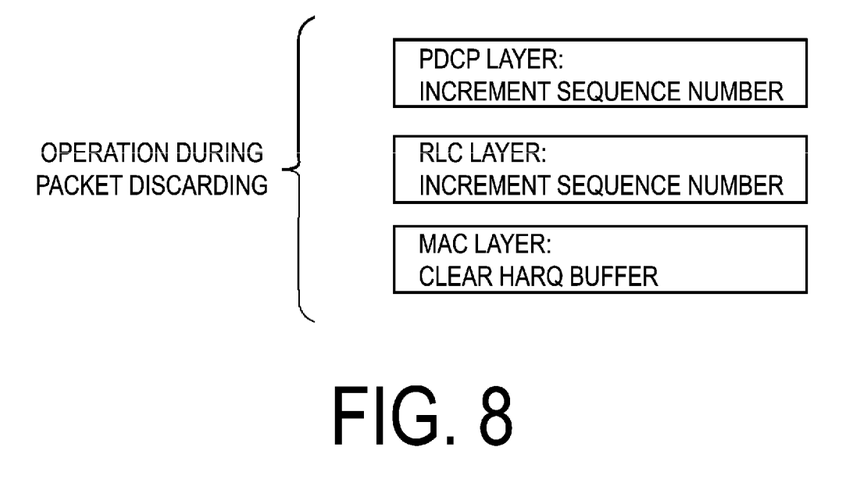
FIG. 8 is a diagram illustrating operation examples of different layers according to an embodiment.

FIG. 8 is a diagram illustrating an operation example of the different layer. As illustrated in FIG. 8, the MAC layer having received the notification from the predetermined layer clears an HARQ buffer. The RLC layer having received the notification from the predetermined layer increments (adds 1 to) an RLC sequence number managed by the RLC layer. The PDCP layer having received the notification from the predetermined layer increments (adds 1 to) a PDCP sequence number managed by the PDCP layer. Here, the sequence number is a consecutive packet identification number assigned to each packet. Incrementing the sequence number allows the consecutiveness of the sequence numbers to be maintained even when the target packet is discarded. Note that the sequence number is normally incremented when the transmission processing for the target packet is complete, but in the present embodiment, the sequence number is also incremented when the target packet is discarded.

When discarding the target packet, the predetermined layer of the communication apparatus 1 may notify the communication apparatus 2 that the target packet has been discarded. The notification may or may not include the sequence number of the discarded target packet.

In step S7, the communication apparatus 1 determines whether any packet subsequent to the target packet exists. If a subsequent packet exists (step S7: YES), the processing returns to step S1. On the other hand, if no subsequent packet exists (step S7: NO), the operation ends.

(3) Operations of Reception-Side Communication Apparatus

Figure 9:
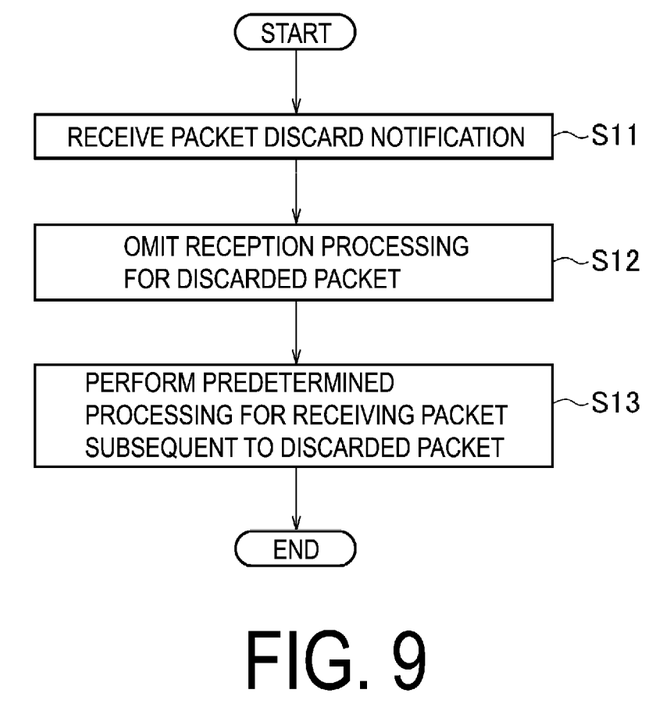
FIG. 9 is a diagram illustrating operations of a reception-side communication apparatus according to an embodiment.

FIG. 9 is a diagram illustrating operations of the communication apparatus 2 (reception-side communication apparatus) according to an embodiment. Here, operations will be described that are performed by the communication apparatus 2 when receiving a packet discard notification from the communication apparatus 1.

As illustrated in FIG. 9, in step S11, the predetermined layer of the communication apparatus 2 receives a packet discard notification from a predetermined layer of the communication apparatus 1. For example, the predetermined layer is the MAC layer, the RLC layer, or the PDCP layer.

In step S12, in response to the packet discard notification, the predetermined layer of the communication apparatus 2 determines that the target packet (i.e., the packet having the largest sequence number) is not to be transmitted from the communication apparatus 1, and omits reception processing for the target packet.

In step S13, the predetermined layer of the communication apparatus 2 performs predetermined processing for receiving a packet subsequent to the discarded target packet.

Here, the predetermined processing may include processing for notifying a different layer from the predetermined layer that the target packet has been discarded (i.e., the target packet is not to be transmitted from the communication apparatus 1). As illustrated in FIG. 8, the MAC layer having received the notification from the predetermined layer clears the HARQ buffer. The RLC layer having received the notification from the predetermined layer increments (adds 1 to) an RLC sequence number managed by the RLC layer. The PDCP layer having received the notification from the predetermined layer increments (adds 1 to) a PDCP sequence number managed by the PDCP layer.

The predetermined processing may include processing for generating a dummy packet (error packet) corresponding to the discarded target packet. The predetermined layer of the communication apparatus 2 generates a dummy packet, and passes the dummy packet generated to the upper layer.

For example, the predetermined layer of the communication apparatus 2 places, in a data portion of a Service Data Unit (SDU) to be passed to an upper layer, error data configured in advance and passes the error data to the upper layer. Assuming that the predetermined layer is the PDCP layer, the PDCP layer generates an IP packet indicating the error data and passes the IP packet to the upper layer. A bit sequence of the error data may be configured in advance. For example, the bit sequence of the error data is notified to an Access Stratum (AS) from the application of the UE 100, and, from the AS, the bit sequence is notified to the gNB 200 and configured for the gNB 200. The bit sequence of error data is notified to the core network from the application of the server, and, from the core network, the bit sequence is notified to the UE 100 and configured for the UE 100.

The predetermined layer of the communication apparatus 2 may place, in a data portion of a SDU to be passed to an upper layer, a data portion of a previous packet successfully received instead of error data configured in advance, and pass the data portion to the upper layer. This is because, for example, with the assumption that motion control is performed for industrial apparatuses, passing to an upper layer the same data as that previously obtained to maintain a previous state is considered to be more desirable than passing error data to the upper layer.

The predetermined layer of the communication apparatus 2 may simply notify the upper layer (such as the application layer) of failed reception, instead of processing the data portion of the SDU to be passed to the upper layer.

The predetermined processing may include processing for transmitting, to the communication apparatus 1, the transmission acknowledgment (ACK) corresponding to the discarded target packet. For example, the predetermined layer of the communication apparatus 2 considers that the discarded target packet has been received, and feeds back the ACK including the sequence number of the target packet.

Variations

In the above-described embodiment, an example has been described in which when discarding a packet, the communication apparatus 1 notifies this to the communication apparatus 2. However, with the assumption that the communication apparatus 1 periodically transmits a packet to the communication apparatus 2, the communication apparatus 2 may utilize the periodicity of packets to estimate that the communication apparatus 1 has discarded a packet, for example. This eliminates the need for the packet discard notification from the communication apparatus 1 to the communication apparatus 2.

Figure 10:
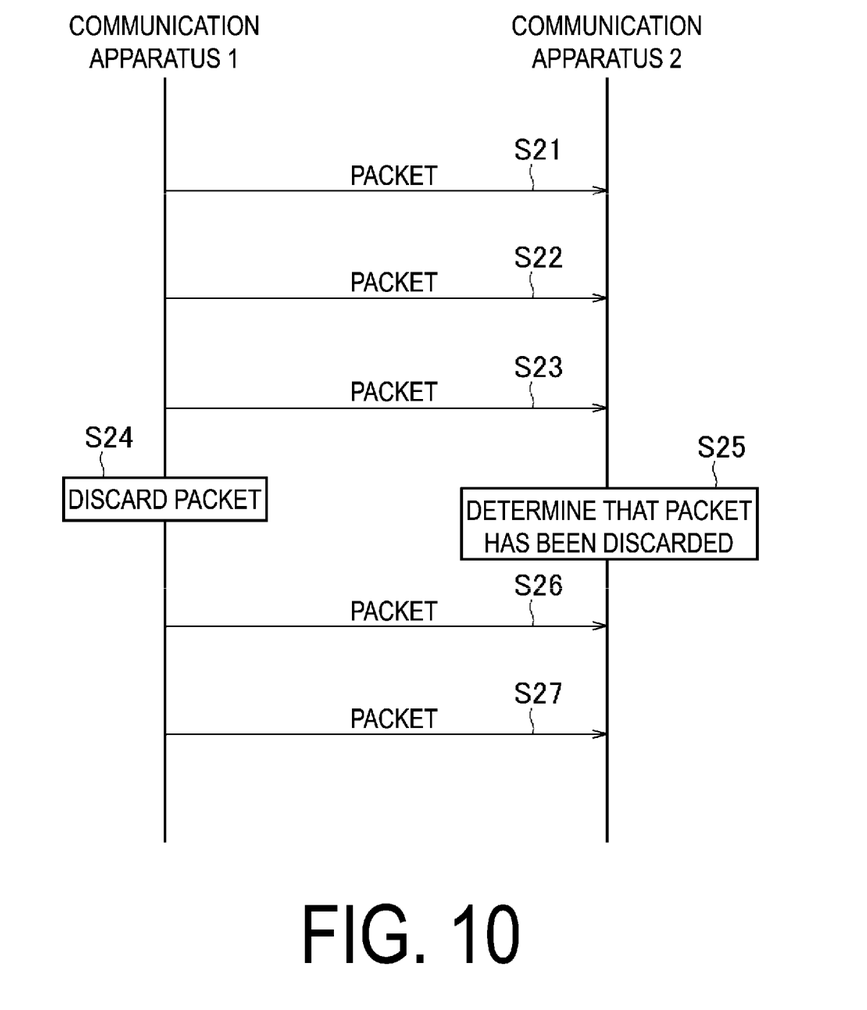
FIG. 10 is a diagram illustrating an overview of a variation of the embodiment.

FIG. 10 is a diagram illustrating an overview of a variation of the embodiment. As illustrated in FIG. 10, in steps S21 to S23, the communication apparatus 1 transmits a packet to the communication apparatus 2 at a predetermined time interval. For example, the communication apparatus 1 transmits a certain number of packets to the communication apparatus 2 at a constant periodicity, as in voice communication using Semi-Persistent Scheduling (SPS).

In step S24, the communication apparatus 1 performs the above-described operation to discard a packet without transmitting the packet.

In step S25, based on the lack of reception of the subsequent packet within a predetermined time from the previous packet reception (step S23), the communication apparatus 2 determines that the communication apparatus 1 has discarded the subsequent packet (i.e., the subsequent packet is not to be transmitted from the communication apparatus 1).

Subsequently, in steps S26 and S27, the communication apparatus 1 transmits a packet to the communication apparatus 2 at a predetermined time interval.

Figure 11:
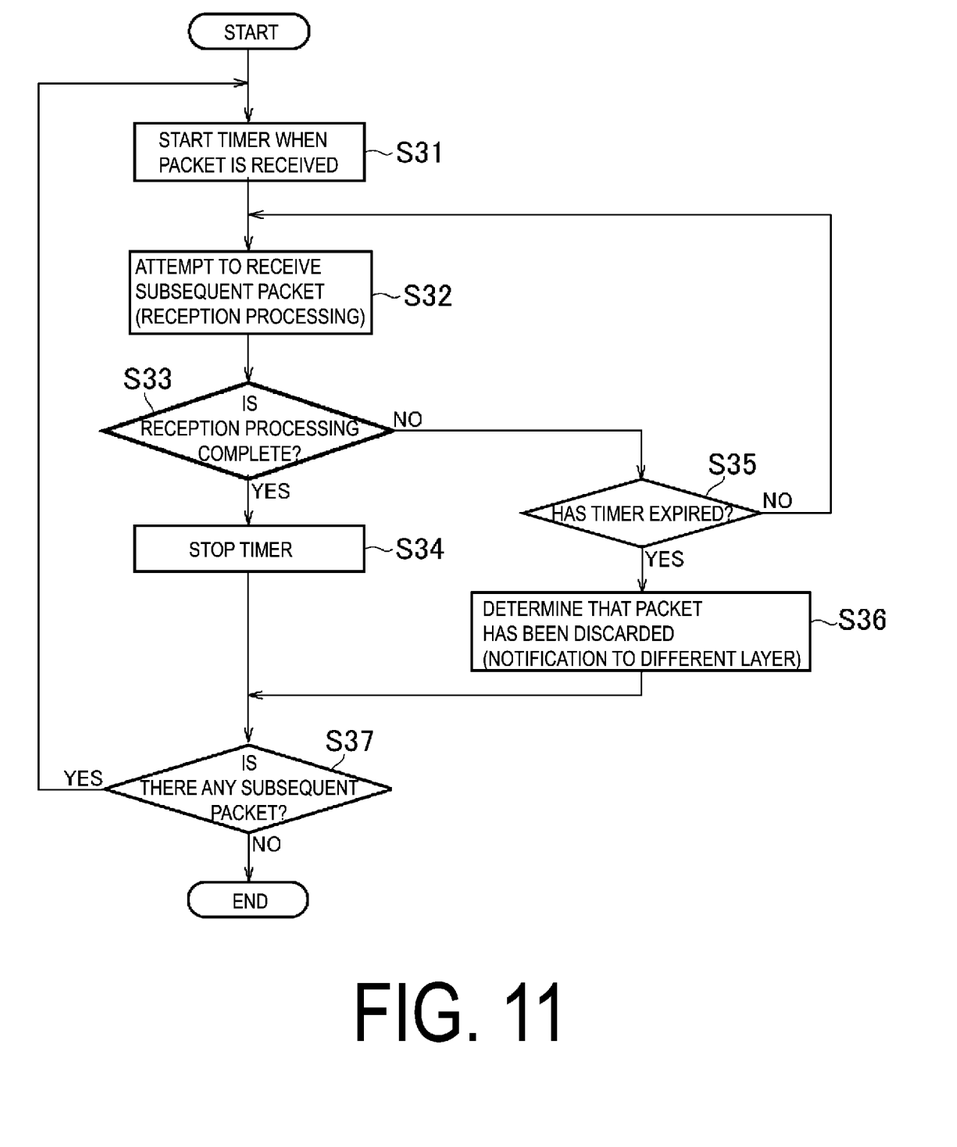
FIG. 11 is a diagram illustrating operations of a reception-side communication apparatus according to the variation of the embodiment.

FIG. 11 is a diagram illustrating operations of the communication apparatus 2 in the variation of the embodiment.

As illustrated in FIG. 11, in step S31, the predetermined layer of the communication apparatus 2 starts the timer when the reception processing for a packet (first packet) is complete. For example, the predetermined layer is the MAC layer, the RLC layer, or the PDCP layer. The timer is configured with a time based on the predetermined time interval described above (e.g., the time obtained by adding an offset time to the predetermined time interval). The timer may be configured with the time threshold described above.

In step S32, the communication apparatus 2 attempts to receive the subsequent packet (second packet) (reception processing).

In step S33, the communication apparatus 1 determines whether the reception processing for the subsequent packet is complete.

Here, determination of whether the reception processing for the subsequent packet is complete may be determination of whether the target packet has been passed from the predetermined layer to the upper layer. The determination of whether the reception processing for the subsequent packet is complete may be a determination of whether the transmission acknowledgment (ACK) corresponding to the subsequent packet has been transmitted to the communication apparatus 1. Here, when the subsequent packet is divided into a plurality of segments, whether all ACKs corresponding to the plurality of segments have been transmitted may be determined.

When the reception processing for the target packet is determined to be complete (step S33: YES), in step S34, the communication apparatus 2 stops the timer started in step S31. Subsequently, the processing proceeds to step S37.

On the other hand, when the reception processing for the subsequent packet is determined to not be complete (step S33: NO), then in step S35, the communication apparatus 2 determines whether the timer started in step S1 has not stopped and has expired.

If the timer started in step S1 has not expired (step S35: NO), the processing returns to step S32.

On the other hand, if the timer started in step S1 expires (step S35: YES), then in step S36, the predetermined layer of the communication apparatus 2 determines that the subsequent packet is not to be transmitted from the communication apparatus 1. In this case, the predetermined layer of the communication apparatus 2 may notify a different layer from the predetermined layer that the subsequent packet is not to be transmitted from the communication apparatus 1 (i.e., that the target packet has been discarded in the communication apparatus 1). As illustrated in FIG. 8, the MAC layer having received the notification from the predetermined layer clears the HARQ buffer. The RLC layer having received the notification from the predetermined layer increments (adds 1 to) an RLC sequence number managed by the RLC layer. The PDCP layer having received the notification from the predetermined layer increments (adds 1 to) a PDCP sequence number managed by the PDCP layer.

In step S36, the predetermined layer of the communication apparatus 2 may generate a dummy packet (error packet) corresponding to the subsequent packet. The predetermined layer of the communication apparatus 2 generates a dummy packet, and passes the dummy packet generated to the upper layer. Specific examples of the dummy packet are the same as, and/or similar to the examples described above in the embodiment.

In step S36, the predetermined layer of the communication apparatus 2 may transmit, to the communication apparatus 1, the transmission acknowledgment (ACK) corresponding to the subsequent packet. For example, the predetermined layer of the communication apparatus 2 considers that the subsequent packet has been received, and feeds back the ACK including the sequence number of the subsequent packet.

Subsequently, in step S37, the communication apparatus 1 determines whether a packet subsequent to the subsequent packet exists. If a packet subsequent to the subsequent packet exists (step S37: YES), the processing returns to step S31. On the other hand, if no packet subsequent to the subsequent packet exists (step S37: NO), the operation ends.
Other Embodiments The residence time and the time threshold described above may be applied to retransmission control. Typically, the reception of NACK from the communication partner triggers the execution of retransmission processing. However, a case of non-negligible delay associated with feedback processing from the communication partner may occur. Thus, even with the residence time being shorter than the time threshold, when a margin to the time threshold becomes low, the communication apparatus 1 desirably performs retransmission without waiting for feedback from the communication partner (communication apparatus 2). The margin may be defined as a difference time with respect to the time threshold (i.e., offset time), or may be an absolute time (i.e., a time threshold 2). The margin may be determined by the communication apparatus and notified to (configured for) the communication partner, or may be determined by the communication partner and notified to (configured for) the communication apparatus.

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like.

Circuits for executing the processes to be performed by the UE 100 or the gNB 200 may be integrated, and at least part of the UE 100 or the gNB 200 may be configured as a semiconductor integrated circuit (a chipset or an SoC).

Embodiments have been described above in detail with reference to the drawings, but specific configurations are not limited to those described above, and various design variation can be made without departing from the gist of the present disclosure.

The invention claimed is:

1. A communication control method for controlling wireless communication of a packet from a first radio communication device to a second radio communication device in a mobile communication system, the communication control method comprising:
    by the first radio communication device,
        measuring, on a per packet basis, a residence time of a packet which has not been transmitted and has resided in the first radio communication device;
        comparing the residence time of the packet with a time threshold;
        discarding the packet with the residence time exceeding the time threshold without transmitting the packet,
        notifying, by the first radio communication device, the second radio communication device that the packet has been discarded; and
        omitting, by the second radio communication device, reception processing for the packet discarded based on the notification from the first radio communication device, and performing predetermined processing for receiving a packet subsequent to the packet discarded.

2. The communication control method according to claim 1, further comprising:
    performing, by the first radio communication device, even after the discarding, processing of transmitting the packet of which the residence time does not exceed the time threshold to the second radio communication device.

3. The communication control method according to claim 1, wherein
    the measuring comprises measuring, on a per IP packet basis, the residence time of the packet.

4. The communication control method according to claim 1, wherein
    the discarding comprises discarding, in a predetermined layer of the first radio communication device, the packet of which the residence time exceeds the time threshold, and
    the communication control method further comprises,
        by the first radio communication device,
            notifying a different layer from the predetermined layer that the packet has been discarded, and
            performing, by the different layer, processing of transmitting a packet subsequent to the packet discarded.

5. The communication control method according to claim 1, wherein
    the time threshold is configured individually per IP flow or per bearer, and
    the comparing comprises comparing the residence time measured for a target packet with the time threshold corresponding to the IP flow or the bearer to which the target packet belongs.

6. The communication control method according to claim 1, wherein
    the measuring comprises starting a timer configured with the time threshold when a first condition is satisfied for a target packet, stopping the timer when a second condition is satisfied for the target packet, and discarding the target packet when the timer is not stopped and expires.

7. The communication control method according to claim 6, wherein the first condition comprises a condition that the packet enters a predetermined layer of the first radio communication device, and the second condition comprises at least one of a condition that the packet has been passed from the predetermined layer to a lower layer of the predetermined layer and a condition that a transmission acknowledgment of the packet has been received from the second radio communication device.

8. The communication control method according to claim 1, wherein the predetermined processing comprises processing of generating a dummy packet corresponding to the packet discarded.

9. The communication control method according to claim 1, further comprising:

with a packet being transmitted from the first radio communication device to the second radio communication device at a predetermined time interval, by the second radio communication device, starting a timer based on the predetermined time interval when reception processing for a first packet from the first radio communication device is complete;

stopping the timer when reception processing for a second packet subsequent to the first packet is complete; and determining that the first radio communication device does not transmit the second packet when the timer is not stopped and expires.

10. A radio communication device configured to transmit a packet to another radio communication device in a mobile radio communication system, the radio communication device comprising:

a controller configured to:

measure, on a per packet basis, a residence time of a packet which has not been transmitted and has resided in the radio communication device;

compare the residence time of the packet with a time threshold; and discard the packet of which the residence time exceeds the time threshold without transmitting the packet; and a transmitter configured to transmit to the another radio communication device, predetermined information indicating that the packet has been discarded, wherein the predetermined information causes the another radio communication device to omit reception for the discarded packet and to perform a predetermined process of receiving a packet subsequent to the discarded packet.

\* \* \* \* \*